2,754,191
Patented July 10, 1956

2,754,191

DEFLUORINATION OF PHOSPHATE ROCK

Clinton A. Hollingsworth, Lakeland, Fla., and John C. Williams, Catasauqua, Pa., assignors, by mesne assignments, to Smith-Douglass Company, Incorporated, Norfolk, Va., a corporation of Virginia No Drawing. Application May 8, 1952,
Serial No. 286,818

9 Claims. (Cl. 71—45)

This invention relates to the defluorination of phosphate rock and similar natural phosphatic materials, and has for its object the provision of an improved method of defluorinating such materials by calcination.

The principal difficulty encountered in the defluorination of phosphate rock by calcination arises from the fact that the temperature required for the removal of fluorine is so near the fusion temperature of the rock that objectionable fusion or sintering takes place before the removal of fluorine to a desired extent is effected. Any pronounced tendency of the calcining charge to fuse or sinter causes individual particles or granules of the charge to acquire a glazed surface coating, the sticking together of softened particles or granules, balling-up of the charge and sticking of the charge to the lining of the calcining apparatus. These incidents of fusion or sintering impede evolution of fluorine (especially from the core of the particle or granule) and give rise to operating difficulties, especially in a rotary kiln. Hence it is not practical to calcine at the optimum defluorinating temperature unless some means is provided to prevent objectionable fusion or sintering at that and somewhat higher temperatures, because at times the operating temperature (particularly in a rotary kiln) will inadvertently rise above the fusion temperature.

Various expedients have heretofore been suggested for promoting the evolution of fluorine and for increasing the refractoriness of the calcining charge. Thus, it has long been recognized that silica and water vapor aid defluorination, but silica in excess of about 4% and up to about 30% lowers the fusion temperature of the calcining charge. It has further been recognized tht phosphoric acid exerts some beneficial effect upon defluorination, but, like silica, phosphoric acid tends to lower the fusion temperature when present in amounts contributing beneficially to fluorine removal. Various additive agents have been included in the calcining charge in endeavors to raise its fusion temperature through the formation within the charge of more refractory compounds or through the coating of individual particles or granules by some refractory reaction product.

In the course of an extensive investigation of the problem of defluorinating phosphate rock by calcination, we have given particular consideration to the provision of a refractory surface coating on individual particles or granules of the phosphatic material. We have found that the composition of the calcining charge, and especially its phosphate ($P_2O_5$), lime ($CaO$) and silica ($SiO_2$) contents, influences the character and effectiveness of any coating applied to the particles or granules. In correlating the experimental data of our investigations, we have adopted certain definitions which the factual data appear to support. These definitions center around the composition of the phosphatic material (or calcining charge) as expressed by the following simple molar formula:

$$\frac{(mols)\ CaO - 3 \cdot P_2O_5}{(mols)\ SiO_2}$$

where part of the lime is replaced by sodium oxide ($Na_2O$) the simple molar formula becomes:

$$\frac{(mols)\ CaO + Na_2O - 3 \cdot P_2O_5}{(mols)\ SiO_2}$$

Usually, the impurities occurring in phosphate rock, such as iron oxide ($Fe_2O_3$), alumina ($Al_2O_3$) and magnesia ($MgO$) need not be considered. However, when such impurities occur in excessive amounts, they should be considered, and the molar formula then becomes:

$$\frac{(mols)\ CaO + Na_2O + MgO - (3 \cdot P_2O_5 + Fe_2O_3 + Al_2O_3)}{(mols)\ SiO_2}$$

Some natural phosphate rocks contain aluminum phosphate in substantial amount, and alumina in that form should not be considered an impurity in the rock, but rather like the lime of tricalcium phosphate, and, accordingly, to the extent that alumina is present as aluminum phosphate, the alumina is a positive compound and should be so considered in the molar formula.

When the ratio expressed by the molar formula is 2, the composition of the charge is theoretically capable of forming tricalcium phosphate ($3CaO \cdot P_2O_5$) and dicalcium silicate ($2CaO \cdot SiO_2$), which compounds may be present in any proportions depending upon the relative amounts of the three components. Since these compounds ($3CaO \cdot P_2O_5$ and $2CaO \cdot SiO_2$) appear to be the most stable compositions of lime-phosphate and lime-silicate, respectively, under the conditions of calcination, we define as "neutral" those charge compositions having a ratio of 2 as expressed by the molar formula. Charge compositions in which the molar formula ratio is less than 2, we define as "negative," and charge compositions having a molar formula ratio in excess of 2, we define as "positive." Since an excess of silica ($SiO_2$) or phosphate ($P_2O_5$), or both, over that theoretically required to form $3CaO \cdot P_2O_5$ and $2CaO \cdot SiO_2$, results in a charge composition which is, by definition, negative, we define these compounds ($SiO_2$ and $P_2O_5$) as negative. Similarly, we define alumina (except as hereinbefore explained) and ferric oxide as negative compounds. Since an excess of lime or sodium oxide or both over that theoretically required to form tricalcium (or sodium) phosphate and dicalcium (or sodium) silicate results in a charge composition which is, by definition, positive, we define lime ($CaO$) and sodium oxide ($Na_2O$) as positive compounds.

In principle, one would expect that a positive coating compound should be applied to a negative charge composition, and a negative coating compound should be applied to a positive charge composition, in order to neutralize or balance the charge composition. In practice, we have found that such coating compounds do tend to neutralize the charge composition, but a chemical reaction appears to take place between the charge and the applied coating, and the coating compound becomes so infused with the charge particle or granule that it cannot be removed therefrom after calcination.

We have found when a negative coating compound is applied to the particles or granules of a negative charge that the coating compound does not usually react during calcination to any great extent with the charge composition, and after calcination the applied coating can in many cases be removed, if desired. We have obtained in practice surprising and very superior results with silica as the negative coating compound. Based on these discoveries, our present invention involves preparing a granular charge of natural phosphatic material in which the mol ratio expressed by the formula $$\frac{\text{(mols) } CaO + Na_2O + MgO - 3 \cdot P_2O_5}{\text{(mols) } SiO_2}$$

does not exceed 1.9, and preferably is substantially less than 1.9. The granules of the charge are coated with finely divided silica. The silica-coated granules are then heat-treated or calcined without substantial fusion at a temperature of at least 2500° F. in the presence of water vapor. A remarkable and characteristic feature of the silica coating is that it does not react to any appreciable extent with the granule, and after calcination the coating may be readily removed from the granule. Nevertheless, the coating does increase the refractoriness of the calcining charge as a whole. If the silica coating did react with the granule, then, to the extent that penetration of silica within the granule was equivalent to incorporating such silica within the granule, the refractoriness of the granule, and hence of the calcining charge, would be decreased, since compounds of lower melting temperatures would be formed. No specific amount of silica, as coating agent, is required so long as the granules of the charge are completely covered therewith. Generally, the silica coating is from 5 to 25% by weight based on the total weight of the calcining charge, i. e. the granules after coating. By granules we mean small lumps of natural phosphate rock such as unground pebble phosphate or crushed lumps of phosphate not exceeding one-half inch in size, agglomerates, nodules and pellets, preferably not exceeding one-half inch in size, of phosphate fines, and equivalent aggregates of phosphatic material.

Ordinary Florida phosphate rock has a mol ratio of about 2, as expressed by the foregoing formula. Since in the preferred practice of the invention, the calcining charge is substantially negative, we mix with the rock either phosphate ($P_2O_5$) or silica ($SiO_2$) or both, in order to prepare a negative charge in which the mol ratio is substantially less than 2. In the preferred practice of the invention such an amount of phosphate or silica is mixed with the phosphatic material that the aforementioned mol ratio does not exceed 1. Phosphate (conveniently in the form of phosphoric acid) is generally preferable to silica, since it increases, rather than decreases, the grade of the product. Moreover, we have found that the phosphate addition (especially as phosphoric acid) reacts promptly with the raw phosphate (without applied heat), and the whole body of the calcining charge is thereby rendered negative. The silica addition, on the other hand, does not react with the raw phosphate without applied heat. A temperature in excess of about 1800° F. is usually required before silica reacts to any appreciable extent with the raw phosphate, and until such reaction takes place the calcining charge is actually a mixture of positive (or neutral) and negative compounds rather than a homogeneously negative charge. Under these conditions, a positive raw phosphate compound contacting a silica coating might have a tendency to react with the coating, particularly at calcining temperatures near the fusion point of the charge.

In order to insure the preparation of a calcining charge that is homogeneously negative, rather than a mixture of positive (or neutral) and negative compounds, it is generally advantageous to carry out the heat-treatment or calcination in two stages. A further advantage of two-stage calcination is that the silica coating is applied to a partially sintered and hence hard granule, which is capable of standing considerably more handling and tumbling in the calcining furnace than unsintered and hence softer granules. Sintered or hard granules can also prepared in advance and stored and subjected to the second stage of calcination at any desired or convenient later time, while unsintered or soft granules should be completely calcined promptly after coating, since the coated granules cannot be stored without disintegration, except in a very dry climate. From one-third to one-half of the fluorine is eliminated during the first stage of calcination, and while the elimination of the remaining fluorine is more difficult, the lesser amount to be eliminated in the second stage of calcination is of some advantage.

In preparing the negative calcining charge for two-stage calcination, the raw phosphatic material is treated or mixed with a negative compound, such as phosphate ($P_2O_5$) or silica ($SiO_2$), or a combination of such compounds. When the phosphatic material is not naturally granular, it is nodulized, pelletized or otherwise formed into granules (e. g. by agglomerating, briquetting, extruding or the like). Porosity agents such as coal, coke, sawdust, rice hulls, frothing agents etc. may be included in the charge mixture, and greater strength may be imparted to the nodules, if desired, by including from 0.5 to 2% of bentonite (or equivalent binding agent) in the charge mixture, before forming into granules. The granules may be made in any suitable apparatus prior to calcination, or may be made in situ in the calcining kiln, as for example by feeding the calcining charge as an aqueous slurry when a calcination is carried out in a rotary kiln. The granular calcining charge is then subjected to the first stage of calcination at a temperature within the range of 1500–2400° F. in the presence of water vapor.

After the first stage heat-treatment, the now relatively hard granules are coated with silica. The silica should be in a finely divided state, preferably 200 mesh or finer. Merely by way of example, we will particularly describe coating the granules with silica flour. Commercial silica flour is ground high silica sand (approx. 98.5% $SiO_2$), of which over 95% is minus 200 mesh and around 85% is minus 325 mesh. In lieu of silica flour, any finely divided high grade silica is suitable, such as the silica concentrate customarily produced in the froth flotation of phosphate rock, ground, if necessary, to minus 200 mesh. The coating may be applied in any suitable manner such as by rolling the slightly moistened granules in the finely divided silica, by spraying with an aqueous slurry of the silica, by passage through a fairly dilute aqueous slurry of the silica etc. In practice, we prefer to mix from 1 to 10% of bentonite (or equivalent binding agent) with the silica in order to produce a tough coating that will withstand a reasonable amount of tumbling and handling. The silica-coated granules are dried, and may be stored or stock-piled, or directly subjected to the second stage of heat-treatment at a temperature of at least 2500° F., and usually at a temperature within the range 2600–2800 F., in the presence of water vapor. Under such conditions, the calcined product is substantially defluorinated and is suitable for use both as a mineral supplement for animal feed and as a fertilizer. Where the calcining charge is made negative by the inclusion therein of a relatively large amount of $P_2O_5$ (e. g. 10–25% of phosphoric acid) and it is desired to make a product for use only as a mineral supplement (soluble in 0.4% hydrochloric acid solution), a lower calcining temperature (say 2200–2400° F.) will give satisfactory results.

Calcination can be carried out in any suitable calcining apparatus, such as a travelling hearth kiln especially of the tunnel type, a shaft furnace especially of the multiple hearth type, an electric furnace, a rotary kiln etc. The refractory lining or walls of the calcining apparatus are composed for the most part of siliceous material, such as silica brick, so that the coated granules have little, if any, tendency to cling or stick to or react with the lining. After the granules have been coated and dried, they should be handled carefully to minimize breaking or fracturing of the coating. Hence, it is preferable to carry out calcination of the silica-coated granules with as little tumbling or movement of the granules as practicable, and for this reason a rotary kiln may not be the most desirable type of calcining apparatus unless calcination is practiced in two stages as hereinbefore described. Intimate and continuous association of water vapor with the entire body of the charge is maintained until substantially complete defluorination is effected. In general, the higher the temperature, the shorter is the required detention period at the ultimate high temperature to effect defluorination and the production of a phosphate product of high fertilizer availability. In most cases, a detention period of 10 to 30 minutes in the hot temperature zone of the calcining apparatus gives satisfactory results. In two-stage calcination, the temperature of the first stage is below that at which fusion of the charge will take place, and hence it is unnecessary that the granules be coated for this stage. While it is advantageous, as hereinbefore pointed out, to carry out the first stage of calcination with a granular charge, this is not necessary since this stage of calcination is a preliminary or conditioning heat-treatment in which the physical condition of the charge is not critical, and granules may be made of the product of this stage of calcination, after grinding if desired or necessary. Moreover, since in the first stage of calcination there is no danger of fusion and the ultimate temperature and retention period at that temperature are not critical, this stage can be carried out at high tonnage rates and with minimum attention to operating conditions. The ultimate calcining temperature, in either the single stage or two-stage practice, is preferably as high as practicable without causing fusion of the charge, and it is especially important and advantageous that the apparatus in which calcination attains this ultimate temperature has a refractory lining of siliceous material, as hereinbefore pointed out.

Coating of the granules, especially when the charge is strongly negative (e. g. when the mol ratio is around 1 or less), with silica minimizes the tendency of the charge to stick together and ball-up in the calcining apparatus. The silica coating also appears to have little attraction for fluorine, and hence redeposition of fluorine on the charge is minimized and higher concentrations of fluorine can be tolerated in the atmosphere surrounding the charge. We believe that the inherent refractoriness of the silica coating is maintained during calcination largely because fluorine is not redeposited thereon, thereby avoiding the formation on and within the charge of fluorine componds having low fusion temperatures. The net result of these phenomena is to increase the output of the calcining apparatus.

The silica coating on the granules is, of course, permeable to gases, so that water vapor may pass therethrough into the interior of the granule and evolved fluorine may pass from the interior of the granule through the coating to the ambient atmosphere. The silica coating does not react to any appreciable extent with the granule in the course of calcination. Indeed, after calcination the coating may be easily removed from the granule. A higher grade product can thus be obtained by removing and separating the coating from the calcined granules. Granules calcined at temperatures above 2500° F. are substantially defluorinated, and are suitable for use both as a plant fertilizer and as a mineral supplement for animal feed.

The following examples illustrate various practices of the invention. In each example, the finally calcined product was substantially defluorinated and had high fertilizer availability.

*Example 1.*—The ground phosphate rock was mixed with phosphoric acid (in order to obtain a strongly negative charge) in the proportion of 95% rock and 5% $P_2O_5$ by weight. The mixture was formed into nodules $3/16$ in. and $3/8$ in. in size, and the damp nodules were rolled in dry silica flour, dried and calcinated in a laboratory electric furnace in an atmosphere of water vapor, 20 minutes being allowed to bring the charge up to the calcining temperature of 2700° F., and the detention period at that temperature being 10 minutes. For comparison, uncoated nodules were similarly calcined, the uncoated and coated nodules being designated by A and B, respectively.

Analyses of rock and charge (excluding coating)

|  | $P_2O_5$ | Insol. | $Fe_2O_3$ | $Al_2O_3$ | CaO | F | Mol ratio |
|---|---|---|---|---|---|---|---|
| Rock | 33.56 | 4.90 | 1.00 | 0.67 | 48.72 | 3.68 | 1.96 |
| Charge | 36.88 | 4.66 | 0.95 | 0.64 | 46.28 | 3.50 | 0.59 |

Calcined nodules

|  | Size, inches | Fluorine, percent | Remarks |
|---|---|---|---|
| A | 3/16 | 0.01 | Slightly glazed. |
| B | 3/16 | 0.01 | No glazing; coating easily removed. |
| A | 3/8 | 0.16 | Glazed. |
| B | 3/8 | 0.11 | No glazing; coating easily removed. |

While substantially complete defluorination was obtained with and without the silica coating, it should be observed that the purpose of the coating is not primarily to promote fluorine removal but rather to impart improved physical characteristics to the charge and to minimize redeposition of fluorine, and its attendant deleterious effects, in a continuously operated calcining apparatus. However, the coating does aid defluorination to the extent that it prevents fusion.

*Example 2.*—The ground phosphate rock was mixed with phosphoric acid in the proportion of 90% rock and 10% acid. There was insufficient lime in the resulting mixture to theoretically form tricalcium phosphate with all of the phosphate ($P_2O_5$) present and hence none to form the calcium silicate, so the mol ratio was minus, i. e. less than zero. The calcining temperature was 2600° F. The other conditions were the same as in Example 1.

Analyses of rock and charge (excluding coating)

|  | $P_2O_5$ | Insol. | CaO | F | Mol ratio |
|---|---|---|---|---|---|
| Rock | 35.90 | 3.83 | 49.45 | 3.92 | 1.93 |
| Charge | 42.31 | 3.45 | 44.51 | 3.53 | minus |

Calcined nodules

|  | Size, inches | Fluorine | Remarks |
|---|---|---|---|
| A | 3/8 | 0.66 | Fused. |
| B | 3/8 | 0.06 | No fusion or glazing; coating easily removed. |

*Example 3.*—The ground phosphate rock was mixed with silica flour (in order to obtain a strongly negative charge) in the proportion of 95% rock and 5% silica flour (98.50% $SiO_2$). Other conditions were the same as in Example 1.

Analyses of rock and charge (excluding coating)

|  | $P_2O_5$ | Insol. | $Fe_2O_3$ | $Al_2O_3$ | CaO | F | Mol ratio |
|---|---|---|---|---|---|---|---|
| Rock | 33.56 | 4.90 | 1.00 | 0.67 | 48.72 | 3.68 | 1.96 |
| Charge | 31.88 | 9.58 | 0.95 | 0.64 | 46.28 | 3.50 | 0.95 |

Calcined nodules

|  | Size, inches | Fluorine | Remarks |
|---|---|---|---|
| A | 3/8 | 0.56 | Fused. |
| B | 3/8 | 0.21 | Slightly fused, but the coating for the most part could be removed. |

*Example 4.*—This example illustrates a two-stage calcination practice. The ground phosphate rock was mixed with phosphoric acid and the rock and charge analyses were the same as in Example 1. The charge was made into 5/16 inch nodules, which were dried and calcined at 2000° F. in the presence of water vapor. The calcined nodules (analyzing 2.3% fluorine) were moistened with water, and rolled in a dry coating mixture made up of 90% silica flour and 10% bentonite, by weight, until the nodules were completely coated. The coated nodules were dried, and calcined at temperatures of 2600° F. and 2700° F. under the same conditions recited in Example 1. After calcination, the coatings were removed and separated from the nodules, and analyses were made of both the coating and the nodule or core.

*Finally calcined nodules*

|   | Calcining temp., °F. | F | $P_2O_5$ | 0.4% HCl | 2% Citric | Citrate |
|---|---|---|---|---|---|---|
| A | 2,600 | .08 | 40.45 | 40.60 | 38.30 | 36.20 |
| B | 2,600 | .05 core<br>.01 coating | 39.85<br>0.75 | 39.30 | 38.55 | 36.45 |
| A | 2,700 | .01 | 40.60 | 40.60 | 40.60 | |
| B | 2,700 | .01 core<br>.02 coating | 40.20<br>2.07 | 40.20 | 39.60 | |

At the calcining temperature of 2600° F. the uncoated nodules (A) were satisfactory, but at the calcining temperature of 2700° F. the uncoated nodules (A) were slightly glazed. At both calcining temperatures, the coated nodules (B) were not glazed, and the coatings were easily removed. There was no lime (CaO) in the removed coatings, indicating no tendency for lime to react with the negative coating agent.

*Example 5.*—This is a repetition of Example 4, except that 5% by weight of silica flour was mixed with the phosphate rock in lieu of phosphoric acid (as in Example 3).

*Finally calcined nodules*

|   | Calcining temp., °F. | F | $P_2O_5$ |
|---|---|---|---|
| A | 2,600 | .41 | 35.00 |
| B | 2,600 | .14 core<br>.01 coating | 35.20<br>1.50 |
| A | 2,700 | .32 | 37.10 |
| B | 2,700 | .03 core<br>.01 coating | 38.00<br>10.65 |

At the calcining temperature of 2600° F. the uncoated nodules (A) were slightly glazed, and at the calcining temperature of 2700° F. the uncoated nodules (A) fused badly. At both calcining temperatures, the coated nodules (B) were not glazed. The coating was easily removed from the coated nodules (B) calcined at 2600° F. In the case of the coated nodules (B) calcined at 2700° F., part of the charge apparently reacted with the coating agent to form a larger coating which was easily removed. The inner core was not fused, while the uncoated nodules were fused. The coating apparently soaked up the fusion. The removable coating analyzed 10.65% $P_2O_5$. However, such an amount of $P_2O_5$ (up to about 20%) forms a highly refractory compound with silica. The $P_2O_5$ availables of the coated nodules calcined at 2600° F. were 35.20% soluble in .04 HCl and 28.40% citrate solubility; and were as good or better in the case of the coated nodules calcined at 2700° F.

Where the mol ratio (expressed by the aforementioned formula) of the calcining charge is less than 2, there is an excess of the acidic (negative) components $SiO_2$ and $P_2O_5$, and hence little, if any, tendency for the charge to seek to be further satisfied by the same acidic components, since the compounds tricalcium phosphate and dicalcium silicate are the most stable forms to which all mixtures of CaO, $P_2O_5$ and $SiO_2$ tend to go as far as possible. Therefore, if a calcining charge is prepared from finely ground materials in such proportions that its mol ratio is less than 2, and then heated to a temperature such that the several components can react among themselves to form readily the largest possible amount of stable compounds, there will then be little, if any, tendency for the charge to react with more silica. Consequently, when a coating of silica is applied on granules of such a charge there is little or no tendency for the coating to react with the granule at normal and preferred operating temperatures, nor is there any tendency of reaction between the coatings on different granules. If the lining of the calcining apparatus has the same chemical comosition as that of the coating (i. e. siliceous), there is no tendency for the coated granule to stick to or react with the lining. Consequently, the principal deterrents to large kiln throughput, i. e., the tendency of the charge to ball-up and coat the kiln lining, are overcome.

In all methods of defluorination by calcination, the effect and action of the fluorine after its liberation from the apatite lattic must be taken into account. If the calcining charge contains any free lime exposed to the gas stream, any fluorine contained therein may be captured by the lime and form compounds which tend to promote fusibility of the charge with all of its ill effects. However, where only silica is exposed to the gas stream, as with the silica-coated granules, any reaction between the fluorine and silica results in the formation of a volatile compound which returns the fluorine (in a different form) to the gas stream for removal from the calcining apparatus. For these reasons the silica coating has peculiar advantages when applied on a negative, and more especially a strongly negative, charge granule.

Throughout this specification and the appended claims "without substantial fusion" means in the absence of such fusion or sintering as to cause the charge to become sticky, in whole or in part, and tend to cling or stick to the lining or wall of the calcining apparatus, and, in a rotary kiln, to ball-up and to fail to flow freely and easily through the kiln. By "substantially defluorinated" is meant a phosphate product containing less than 1 part of fluorine per 40 parts of phosphorus. For use as a plant fertilizer, the "availability" of the phosphate (expressed as $P_2O_5$ availability) should be at least 85% as determined by the customary neutral ammonium citrate test, or alternatively by the 2% citric acid solubility test, and by "high fertilizer availability" is meant a $P_2O_5$ availability exceeding 85% as determined by those tests.

We claim:
1. The method of defluorinating by calcination a natural phosphatic material which comprises preparing from said phosphatic material a granular calcining charge in which the mol ratio expressed by the formula

$$\frac{(\text{mols}) \, CaO + Na_2O + MgO - 3 \cdot P_2O_5}{(\text{mols}) \, SiO_2}$$

does not exceed 1.9, coating the granules of the charge with finely divided silica, and calcining the silica-coated granules at a temperature of at least 2500° F. in the presence of water vapor and without substantial fusion, the coating, after calcining, being readily removable from the phosphatic material and containing not more than about 20% $P_2O_5$.

2. The method of claim 1 in which the silica coatings on the granules amount to from 5 to 25% by weight of the coated granules.

3. The method of claim 1 in which the granules are coated with a mixture of finely divided silica and 1 to 10% by weight of bentonite.

4. The method of defluorinating by calcination a natural phosphatic material which comprises preparing from said phosphatic material a granular calcining charge in which the mol ratio expressed by the formula $$\frac{(\text{mols}) \; CaO + Na_2O + MgO - 3 \cdot P_2O_5}{SiO_2}$$

does not exceed 1, coating the granules of the charge with finely divided silica in such amount that the silica coatings on the granules amount to from 5 to 10% by weight of the coated granules, and calcining the silica-coated granules at a temperature of at least 2500° F. in the presence of water vapor and without substantial fusion, the coating, after calcining, being readily removable from the phosphatic material and containing not more than about 20% $P_2O_5$.

5. The method of defluorinating by calcination a natural phosphatic material which comprises preparing from said phosphatic material a calcining charge in which the mol ratio expressed by the formula $$\frac{(\text{mols}) \; CaO + Na_2O + MgO - 3 \cdot P_2O_5}{(\text{mols}) \; SiO_2}$$

does not exceed 1.9, subjecting the charge to calcination at a temperature within the range of 1500–2400° F. in the presence of water vapor, coating granules of the resulting calcine with finely divided silica, and calcining the silica-coated granules at a temperature of at least 2500° F. in the presence of water vapor, the coating, after calcining, being readily removable from the phosphatic material and containing not more than about 20% $P_2O_5$.

6. The method of defluorinating by calcination a natural phosphatic material which comprises mixing the material with phosphoric acid to prepare a calcining charge in which the mol ratio expressed by the formula $$\frac{(\text{mols}) \; CaO + Na_2O + MgO - 3 \cdot P_2O_5}{(\text{mols}) \; SiO_2}$$

is less than 1.9, coating granules of said charge mixture with finely divided silica in such amount that the silica coatings comprise from 5 to 25% by weight of the coated granules, and calcining the silica-coated granules at a temperature of at least 2500° F. in the presence of water vapor and without substantial fusion, the coating, after calcining, being readily removable from the phosphatic material and containing not more than about 20% $P_2O_5$.

7. The method of defluorinating by calcination a natural phosphatic material which comprises preparing a granular calcining charge of the phosphatic material mixed with phosphoric acid in such amount that the mol ratio of the charge expressed by the formula $$\frac{(\text{mols}) \; CaO + Na_2O + MgO - 3 \cdot P_2O_5}{(\text{mols}) \; SiO_2}$$

does not exceed 1, subjecting the granular charge to calcination at a temperature within the range of 1500–2400° F. in the presence of water vapor, coating the resulting calcined granules with finely divided silica in such amount that the coatings comprise from 5 to 25% by weight of the coated granules, and calcining the silica-coated granules in an apparatus having a siliceous lining at a temperature of at least 2500° F. in the presence of water vapor and without substantial fusion, the coating, after calcining, being readily removable from the phosphatic material and containing not more than about 20% $P_2O_5$.

8. The method of defluorinating by calcination a natural phosphatic material which comprises mixing the material with a compound selected from the class consisting of silica and phosphoric acid to prepare a calcining charge in which the mol ratio expressed by the formula $$\frac{(\text{mols}) \; CaO + Na_2O + MgO - 3 \cdot P_2O_5}{(\text{mols}) \; SiO_2}$$

is less than 1.9, coating granules of said charge mixture with finely divided silica in such amount that the coatings comprise from 5 to 25% by weight of the coated granules, and calcining the silica coated granules at a temperature of at least 2500° F. in the presence of water vapor and without substantial fusion, the coating, after calcining, being readily removable from the phosphatic material and containing not more than about 20% $P_2O_5$.

9. The method of defluorinating by calcination a natural phosphatic material which comprises preparing a granular calcining charge of the phosphatic material mixed with a compound selected from the class consisting of silica and phosphoric acid in such amount that the mol ratio of the charge expressed by the formula $$\frac{(\text{mols}) \; CaO + Na_2O + MgO - 3 \cdot P_2O_5}{(\text{mols}) \; SiO_2}$$

is less than 1.9, subjecting the granular charge to calcination at a temperature within the range of 1500–2400° F. in the presence of water vapor, coating the resulting calcined granules with finely divided silica, and calcining the silica-coated granules at a temperature of at least 2500° F. in the presence of water vapor and without substantial fusion, the coating, after calcining, being readily removable from the phosphatic material and containing not more than about 20% $P_2O_5$.

References Cited in the file of this patent

UNITED STATES PATENTS

| | | |
|---|---|---|
| 2,155,556 | Kerschbaum | Apr. 25, 1939 |
| 2,337,498 | Ritter et al. | Dec. 21, 1943 |
| 2,360,197 | Butt | Oct. 10, 1944 |
| 2,442,969 | Butt | June 8, 1948 |
| 2,446,978 | Maust | Aug. 10, 1948 |
| 2,556,541 | Hollingsworth | June 12, 1951 |

FOREIGN PATENTS

| | | |
|---|---|---|
| 453,646 | Great Britain | Sept. 11, 1936 |